W. LANGDON.
PIPE HANGER.
APPLICATION FILED JUNE 7, 1918.
1,289,822.
Patented Dec. 31, 1918.
2 SHEETS—SHEET 1.
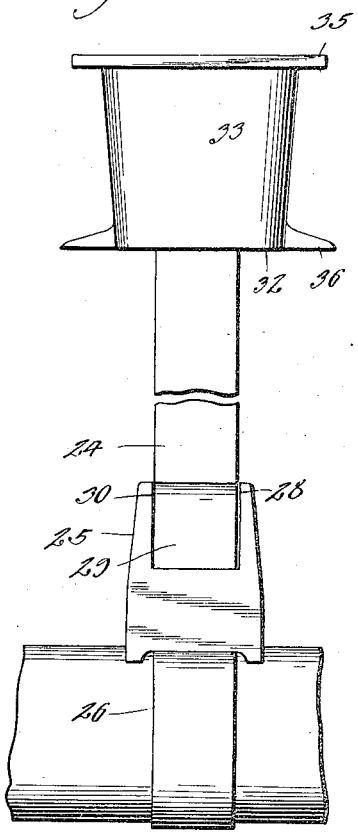
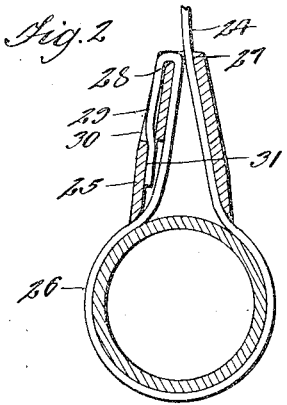
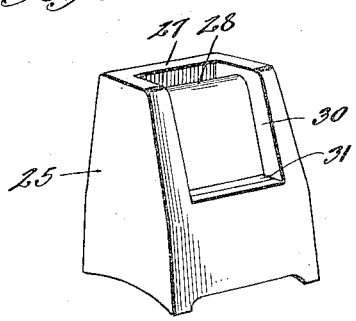
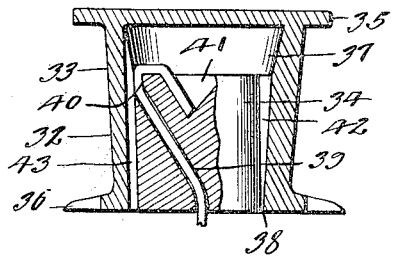
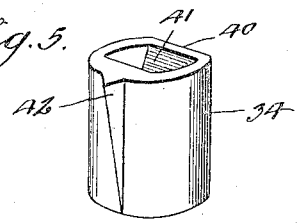
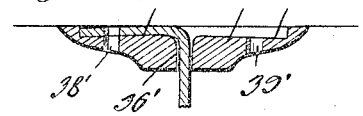
Witnesses
Inventor
W. Langdon,
By Victor J. Evans
Attorney

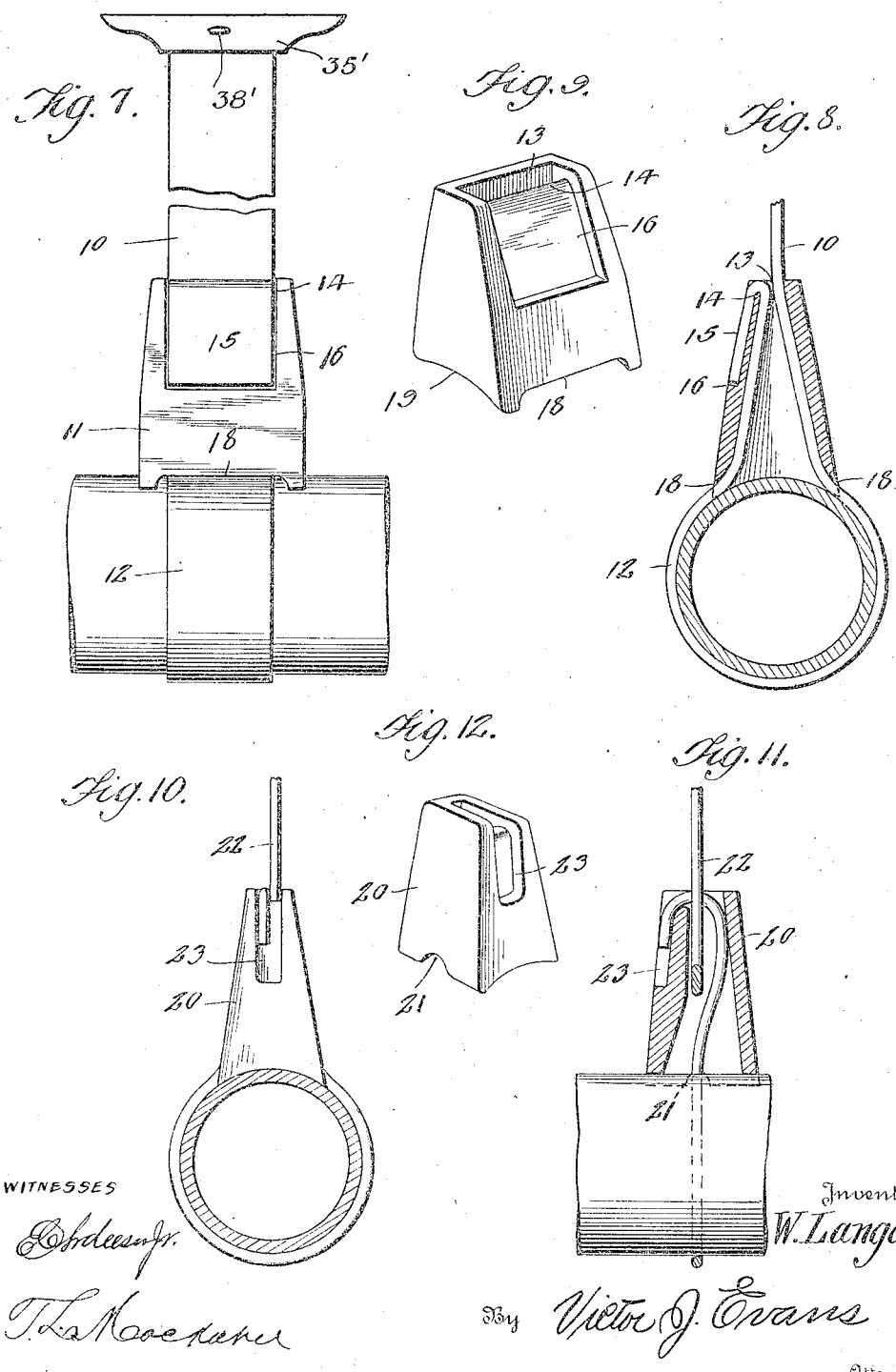

UNITED STATES PATENT OFFICE.

WILLIAM LANGDON, OF TOLEDO, OHIO.

PIPE-HANGER.

1,289,822.   Specification of Letters Patent.   Patented Dec. 31, 1918.

Application filed June 7, 1918. Serial No. 238,749.

*To all whom it may concern:*

Be it known that I, WILLIAM LANGDON, a citizen of the United States, residing at Toledo, in the county of Lucas and State of Ohio, have invented new and useful Improvements in Pipe-Hangers, of which the following is a specification.

This invention relates to hangers especially designed for suspending pipes from ceilings of buildings, although it may be used with equal advantage for supporting cables or similar articles of different diameters, the primary object being to provide a hanger which will securely hold the pipes in position and which will permit of their adjustment with respect to their support, so that proper alinement may be obtained when necessary.

For the accomplishment of the above the invention includes a novel form of adjusting element, by means of which the pipe encircling loop may be regulated to accompanying pipes of different diameters, permitting of a snug fit around the pipe and leaving one end of the supporting or hanger strap free for adjustable engagement with a suitable hanger or support, whereby the pipe or cable may be properly leveled or graded.

The invention also includes a novel anchoring element, by means of which the leveling or grading may be accomplished and which may be formed of two members, one of which is embedded in the supporting structure and the other to which the hanger strap is secured, removably secured within the first mentioned member.

The invention further consists of the following novel construction, combination and arrangement of parts, to be hereinafter more fully described and illustrated in the accompanying drawings, in which:—

Figure 1 is a side elevation of a hanger constructed in accordance with the present invention and shown supporting a pipe suspended from a ceiling or other structure;

Fig. 2 is an enlarged section through the adjusting element;

Fig. 3 is a detail perspective view of the said element;

Fig. 4 is an enlarged sectional view through the anchoring means;

Fig. 5 is a detail perspective view of the inner member of the said anchoring means;

Fig. 6 is a section through a modified form of anchoring or securing plate;

Fig. 7 is a view similar to Fig. 1 showing a modified form of the lower end of the hanger taken through the adjusting element;

Fig. 8 is an enlarged sectional view of the lower end of the hanger taken through the adjusting element;

Fig. 9 is a detail perspective view of this element;

Fig. 10 is a side elevation of a modified form of adjusting element used in connection with a supporting wire hanger;

Fig. 11 is a section through the subject matter of Fig. 10; and

Fig. 12 is a detail perspective view of the hanger shown in Figs. 10 and 11.

Referring to the drawings in detail and especially to Figs. 1 to 5 inclusive, there is illustrated a hanger especially designed for supporting pipes and which includes a strap 24 formed of flexible metal upon which is adapted to be threaded an adjusting element 25, in a manner to form a loop 26.

The adjusting element 25 is preferably of hollow conical formation, the strap 24 being threaded therethrough, one end of the strap extending over the restricted open end 27 and being bent over an edge or shoulder 28, the extremity 29 of the strap lying within a depression 30, which forms an entrance to a pocket 31 provided in one side of the adjusting element 25. The extremity 29 of the strap 24 is thus securely held against accidental removal, so that a positive engagement between the end of the strap and the said element is assured. The edge or shoulder 28 is preferably located below the edge of the opening in the restricted end 27, so that when the strap is folded over into the depression 30 for entrance into the pocket 31, it will lie substantially flush with the upper edge of the opposite element.

After the formation of the loop 26, the opposite end of the strap 24 is passed through the restricted end 27 of the adjusting element to permit of its engagement with a suitable support or hanger, one form of which is shown at 32. This hanger comprises an outer socket member and an inner substantially cylindrical member 33 and 34 respectively. The outer socket member 33 is adapted to be molded in the supporting structure, such as in buildings of concrete construction and is preferably circular in cross section and tapered as shown. The upper closed end of the member 33 is provided with a substantially rectangular projecting flange 35, which forms a retaining means and resists withdrawal of the socketed member from its embedded possession. Diametrically extending slotted ears 36 are provided at the lower open end of the member 33, for the reception of screws for securing the member to the form of the concrete structure. The socket 37 within the member 33 flares upwardly and outwardly, the open end 38 being of the smallest diameter, while the upper closed end is of a comparatively great diameter. The inner member 34 is substantially cylindrical and is provided with a passage 39 extending at an inclination therethrough, the said passage entering one end of the member 34 approximately centrally thereof and opening through the outer wall near the top as shown at 40. The opposite end of the member 34 is formed with an angular depression or socket 41, so that the end of the strap 24 may be threaded through the passage 39 and bent over into the angular socket 41. The outer surface of the member 34 is provided with a tapering bead or tongue 42 which extends longitudinally thereof, a restricted end of the tapered bead being at the end through which the strap 24 enters the member 34. Formed within the socket 37, is a longitudinal groove 43, which is adapted to receive the tongue or bead 42 to permit of the insertion of the member 34 within the socket 37, the relative size and formation of the various parts permitting of the rotation of the said member 34 within the member 33, whereby the bead or tongue 32 will be disengaged from the groove 43 and removal of the member 34 prevented. This manner of fastening will permit the strap to hang without twisting in any position and will enable it to be quickly secured in position without danger of accidental displacement. By turning the last mentioned member however so that the tongue or bead can enter the groove, the member 34 may be readily removed. Adjustment of the strap 24 may be made either at the end secured to the member 34, namely the anchoring end, or the opposite end which engages the pocket 31.

In Fig. 6 there is illustrated a modified form of anchoring means, which consists of a plate 35′, which is centrally slotted as shown at 36′ for the passage of one end of the strap 24. This plate is also provided upon its upper surface with oppositely arranged depressions, which form seats 37′ for the reception of the bent over extremity of the strap, which is perforated for the reception of a screw or other fastening device, which is adapted to also pass through perforations 36′ in the plate. Other perforations 39′ are provided in the plate to provide means for securing the latter to a support.

In Figs. 7 to 9 inclusive there is shown a modified form of hanger, the strap 10 of which is similar to the strap 24 and is threaded through an adjusting element 11 to form a loop 12, one end of the strap extending through a restricted end 13 of the adjusting element, which is of a construction similar to the adjusting element 25 previously described, except that the pocket 31 is omitted. As will be seen from these figures, the adjusting element 11 is formed with a shoulder 14 over which one end of the strap is bent, the extremity 15 of the strap lying within a depression 16 provided in the outer surface of the said element. The opposite end of the strap 10 is passed through the restricted end 13 of the element 11 so as to provide the loop for the reception of the pipe as shown and is engaged over a suitable anchoring member 17. Each side of the element 11 is cut away to provide seats 18 for the passage of the strap, so that the arcuate shaped ends 19 may be engaged around the surface of the pipe.

In the form of the invention shown in Figs. 10 to 12 inclusive, the adjusting element 20 is similar in construction to the one previously described, except that the seats 21 are of semi-circular formation for the reception of a soft wire suspending member 22. This wire is formed into a loop and threaded over the element 20, one end being bent transversely across the opposite strand and into the depression or seat 23, while the opposite end is extended for engagement with an anchor of any desired formation. By bending the ends of the wire in the manner shown, the strands are caused to bite into each other and to prevent the end which is within the depression 23 from straightening out, as might occur in the use of soft wire.

It is believed that from the foregoing description and the accompanying drawings, the construction, use and advantages of the invention will be apparent.

Various other changes may be made in the form, proportion and details of construction and the right is herein reserved to make all changes that fall within the scope of the appended claims.

Having described the invention, what is claimed is:—

1. A pipe hanger embodying an elongated flexible member, a hollow conical element threaded upon said member in a manner to form a loop, means formed on the conical element for receiving the extremity of the flexible member to hold said extremity in engagement with said element, and means engageable with the opposite end of the flexible member for securing the latter to a support.

2. A pipe hanger embodying an elongated flexible member, a hollow conical element threaded upon said member in a manner to form a loop, means formed on the conical element for receiving the extremity of the flexible element to hold said element and removable means engageable with the opposite end of the flexible member for securing the latter to a support.

3. A pipe hanger embodying an elongated flexible member, a hollow conical element threaded upon said member in a manner to form a loop, means formed on the conical element for receiving the extremity of the flexible member to hold the latter in engagement with the conical element, a socket member adapted to be permanently secured to a support and means removably and adjustably secured to the opposite end of the flexible member for removable engagement with the socket member.

4. A pipe hanger embodying an elongated flexible member, a hollow conical element threaded upon said member in a manner to form a loop, a pocket formed in the conical element for receiving the extremity of the flexible member to hold said extremity in engagement with said element and means engageable with the opposite end of the flexible member for securing the latter to a support.

5. A pipe hanger embodying an elongated flexible member, a hollow conical element threaded upon said member in a manner to form a loop, a shoulder formed on said conical element whereby one end of the flexible member may be bent over to provide engaging means and a pocket also formed in the conical element for receiving the extremity of the flexible member to hold said extremity in engagement with said element and means engageable with the opposite end of the flexible member for securing the latter to a support.

6. A pipe hanger embodying an elongated flexible member, a hollow conical element threaded upon said member in a manner to form a loop, an engaging shoulder formed on said element, whereby one end of the flexible member may be bent over to provide a securing means and a pocket provided in the conical element for receiving the extremity of the flexible member.

7. The combination with a flexible strap or rod, of a hollow conical element adapted to be threaded upon said strap or rod in a manner to provide a loop, one end of said element being flared and provided with arcuate shaped seats, a depression formed in the outer surface of the conical element adjacent the restricted end thereof to define an engaging edge or shoulder for one end of the flexible strap or rod and a pocket provided in the conical element for receiving the extremity of said strap or rod.

In testimony whereof I affix my signature.

WILLIAM LANGDON.

Copies of this patent may be obtained for five cents each, by addressing the "Commissioner of Patents, Washington, D. C."